US007592396B2

United States Patent
Pelliconi et al.

(10) Patent No.: US 7,592,396 B2
(45) Date of Patent: *Sep. 22, 2009

(54) POLYOLEFIN COMPOSITIONS HAVING HIGH FLUIDITY

(75) Inventors: Anteo Pelliconi, Rovigo (IT); Antonella Angelini, Ferrara (IT)

(73) Assignee: Basell Poliolefine Italia s.r.l., Milan (IT)

( * ) Notice: Subject to any disclaimer, the term of this patent is extended or adjusted under 35 U.S.C. 154(b) by 0 days.

This patent is subject to a terminal disclaimer.

(21) Appl. No.: 11/904,176

(22) Filed: Sep. 26, 2007

(65) Prior Publication Data

US 2008/0090969 A1 Apr. 17, 2008

Related U.S. Application Data

(63) Continuation of application No. 10/507,250, filed as application No. PCT/EP03/02299 on Mar. 5, 2003, now Pat. No. 7,294,674.

(30) Foreign Application Priority Data

Mar. 12, 2002 (EP) .................................. 02075991

(51) Int. Cl.
*C08L 23/04* (2006.01)
*C08L 23/10* (2006.01)
*C08L 23/16* (2006.01)

(52) U.S. Cl. .................. 525/191; 525/216; 525/232; 525/240

(58) Field of Classification Search .................. None
See application file for complete search history.

(56) References Cited

U.S. PATENT DOCUMENTS

| 4,399,054 | A | 8/1983 | Ferraris et al. |
| 4,472,524 | A | 9/1984 | Albizzati |
| 5,145,819 | A | 9/1992 | Winter et al. |
| 5,324,800 | A | 6/1994 | Welborn, Jr. et al. |
| 5,360,868 | A | 11/1994 | Mosier et al. |
| 6,355,731 | B1 | 3/2002 | Govoni et al. |
| 6,743,864 | B2 | 6/2004 | Glogovsky et al. |
| 7,294,674 | B2 | 11/2007 | Pelliconi et al. |

2004/0198919 A1 10/2004 Pelliconi et al.

FOREIGN PATENT DOCUMENTS

| EP | 45977 | 2/1982 |
| EP | 129368 | 12/1984 |
| EP | 361493 | 4/1990 |
| EP | 400333 | 12/1990 |
| EP | 412534 | 2/1991 |
| EP | 416815 | 3/1991 |
| EP | 420436 | 4/1991 |
| EP | 472946 | 3/1992 |
| EP | 485823 | 5/1992 |
| EP | 643066 | 3/1995 |
| EP | 671404 | 9/1995 |
| EP | 728769 | 8/1996 |
| WO | 91/04257 | 4/1991 |
| WO | 00/11057 | 3/2000 |
| WO | 03/011962 | 2/2003 |

*Primary Examiner*—Vasu Jagannathan
*Assistant Examiner*—Gennadiy Mesh
(74) *Attorney, Agent, or Firm*—Jarrod N. Raphael

(57) ABSTRACT

A polyolefin composition suitable for preparing films and sheets, comprising: (A) from 15 to 40% by weight of a crystalline copolymer of propylene with at least one alpha-olefin of formula $H_2C=CHR^1$, where $R^1$ is H or a $C_{2-8}$ linear or branched alkyl, containing at least 90% by weight of propylene, having solubility in xylene at room temperature lower than 15% by weight; (B) from 60 to 85% by weight of an elastomeric fraction comprising: (1) a copolymer of propylene with ethylene, optionally containing 0.5 to 5% by weight of a diene, containing from 20 to 35% by weight ethylene, and having solubility in xylene at room temperature greater than 45% by weight, the intrinsic viscosity of the xylene soluble fraction ranging from 1.0 to 3.9 dl/g; and (2) a copolymer of ethylene with at least one alpha-olefin of formula $H_2C=CHR^2$, where $R^2$ is a $C_{2-8}$ linear or branched alkyl, optionally containing 0.5 to 5% by weight of a diene, containing 15% to 40% by weight alpha-olefin, and having solubility in xylene at room temperature greater than 35% by weight, the intrinsic viscosity of the xylene soluble fraction ranging, from 1.0 to 3.0 dl/g; the (1)/(2) weight ratio ranging from 1:5 to 5:1. The polyolefin composition of the invention, preferably prepared by sequential polymerization in at least three stages, has a flexural modulus lower than 130 Mpa, shore D hardness lower than 40, and MFR $\geq 1.5$ g/10 min.

18 Claims, No Drawings

POLYOLEFIN COMPOSITIONS HAVING HIGH FLUIDITY

FIELD OF THE INVENTION

The present invention concerns polyolefin compositions having improved fluidity, softness and free of gels, which can be advantageously used for producing films and sheets, and in particular cast films. These compositions may be obtained by a sequential polymerization process.

PRIOR ART DISCLOSURE

Polyolefin compositions having elastic properties, as well as good mechanical and optical properties have been used in many application fields, due to the characteristics which are typical of polyolefins (such as chemical inertia, mechanical properties and nontoxicity); moreover, these compositions show outstanding cost/performance ratios.

In the state of the art, elastic polypropylene compositions retaining a good mechanical behavior has been obtained by way of sequential copolymerization of propylene, optionally containing minor quantities of olefin comonomers, and then ethylene/propylene or ethylene/alpha-olefin mixtures. Catalysts based on halogenated titanium compounds supported on magnesium chloride are commonly used for this purpose.

For instance EP-A-400 333, in the name of the same Applicant, describes elastoplastic polyolefin compositions, obtained by sequential polymerization, comprising:
A) 10-60 parts by weight of a crystalline polymer or copolymer of propylene;
B) 10-40 parts by weight of a polymer fraction containing ethylene, insoluble in xylene at room temperature; and
C) 30-60 parts by weight of an ethylene/propylene copolymer fraction, soluble in xylene at room temperature.

These compositions do not show satisfactory flexibility and elastic properties, as demonstrated by the flexural modulus values (comprised between 200 and 700 MPa); moreover, they do not have satisfactory optical properties, such as transparency.

EP-A-472 946, in the name of the same Applicant, describes flexible polyolefin compositions comprising, in parts by weight:
A) 10-50 parts of an isotactic propylene homopolymer or copolymer;
B) 5-20 parts of an ethylene copolymer, insoluble in xylene at room temperature; and
C) 40-80 parts of an ethylene/propylene copolymer containing less than 40% by weight of ethylene and being soluble in xylene at room temperature; the intrinsic viscosity of said copolymer is preferably from 1.7 to 3 dl/g.

These compositions have a flexural modulus of less than 150 MPa and a Shore D hardness between 20 and 35. Although these mechanical properties are advantageous with respect to the compositions known in the prior art, and are relatively satisfactory for certain applications, they exhibit very low fluidity values; in fact, the Melt Flow Rate (MFR) values of the disclosed polyolefin compositions are not higher than 1.5 g/10 min (the Applicant measured the MFR values of the compositions prepared in Examples 1-5 of the cited document, which resulted respectively equal to 1.4, 1.0, 1.0, 0.8 and 1.0 g/10 min). Due to these values (inferior to 1.5), for many applications, such as cast films, the polymer does not show a sufficient fluidity and therefore is not processable with common techniques.

As it is well known in the art, the MFR values of polyolefin compositions may be enhanced by peroxide treatments; nevertheless, this treatment causes various drawbacks, such as the yellowness of the polymer, the formation gels and the release of bad odors during the subsequent treatments. Moreover, in many countries, the products obtained by visbreaking may not be used in food applications, such as fresh products packaging.

The European Patent Application No. 1202876.7, in the name of the same Applicant, describes a polyolefin composition comprising:
(A) from 8 to 25% by weight of a crystalline propylene homopolymer or copolymer; and
(B) from 75 to 92% by weight of an elastomeric fraction comprising a first elastomeric copolymer of propylene with 15-32% wt ethylene, the intrinsic viscosity of the xylene soluble fraction ranging from 3.0 to 5.0 dl/g; and a second elastomeric copolymer of propylene with more than 32% up to 45% wt. of ethylene, the intrinsic viscosity of the xylene soluble fraction ranging from 4.0 to 6.5 dl/g.

These compositions have flexural modulus values lower than 60 M/Pa and very good hardness values (Shore A hardness lower than 90); nevertheless, they exhibit very low fluidity. In fact, the polyolefin compositions described in the application show MFR values not higher than 0.1 g/10 min. As reported above, such values are not satisfactory for many applications, such as cast films, and the peroxide treatment of these compositions to enhance the MFR would inevitably lead to gels formation, yellowness of the final product, as well as to the release of bad odors during the subsequent transformation.

Therefore, it is felt the need for polyolefin compositions, having high softness and good mechanical properties (such as hardness), at the same time having an enhanced fluidity (i.e. high MFR values) without the presence of gels and other negative effects due to peroxide treatments.

SUMMARY OF THE INVENTION

The present invention concerns a polyolefin composition comprising:
(A) from 15 to 40% by weight of a crystalline copolymer of propylene with at least one alpha-olefin of formula $H_2C=CHR^1$, where $R^1$ is H or a $C_{2-8}$ linear or branched alkyl, containing at least 90% by weight of propylene, and having solubility in xylene at room temperature lower than 15% by weight;
(B) from 60 to 85% by weight of an elastomeric fraction comprising:
 (1) a copolymer of propylene with ethylene, optionally containing 0.5 to 5% by weight of a diene, containing from 20 to 35% by weight ethylene, and having solubility in xylene at room temperature greater than 45% by weight, the intrinsic viscosity of the xylene soluble fraction ranging from 1.0 to 3.0 dl/g; and
 (2) a copolymer of ethylene with at least one alpha-olefin of formula $H_2C=CHR^2$, where $R^2$ is a $C_{2-8}$ linear or branched alkyl, optionally containing 0.5 to 5% by weight of a diene, containing 15% to 40% by weight alpha-olefin, and having solubility in xylene at room temperature greater than 35% by weight, the intrinsic viscosity of the xylene soluble fraction ranging from 1.0 to 3.0 dl/g; the (1)/(2) weight ratio ranging from 1:5 to 5:1.

The polyolefin composition of the invention, preferably prepared by sequential polymerization in at least three stages, has a flexural modulus $\leq 130$ MPa, Shore D hardness $\leq 40$, and MFR $\geq 1.5$ g/10 min.

It is another object of the present invention a process for the preparation of the polyolefin composition reported above, comprising at least three sequential polymerization stages, with each subsequent polymerization being conducted in the presence of the polymeric material formed in the immediately preceding polymerization reaction, wherein the crystalline copolymer (A) is prepared in a first stage, and the elastomeric fraction (B) is prepared in at least two subsequent stages. According to a preferred embodiment, all the polymerization stages are carried out in the presence of a catalyst comprising a trialkylaluminum compound, optionally an electron donor, and a solid catalyst component comprising a halide, or halogen-alcoholate of Ti, and an electron donor compound supported on anhydrous magnesium chloride, said solid catalyst component having a surface area (measured by BET) of less than 200 m²/g, and a porosity (measured by BET) higher than 0.2 ml/g.

DETAILED DESCRIPTION OF THE INVENTION

The polyolefin compositions of the invention are endowed with high fluidity, as evidenced by MFR values ≧1.5 g/10 min, and are gel-free. Moreover, they exhibit a very good balance of softness and mechanical properties, and in particular of Flexural Modulus values and Shore D hardness, at the same time retaining good elastomeric properties.

These polyolefin compositions comprise from 15 to 40% by weight, preferably from 20 to 35%, and even more preferably from 25 to 30% of a crystalline copolymer of propylene (A), and from 60 to 85% by weight, preferably from 65 to 80%, and even more preferably from 70 to 75% by weight of an elastomeric fraction (B).

The crystalline copolymer (A) of the compositions of the invention is a copolymer of propylene with an alpha-olefin $H_2C=CHR^1$, where $R^1$ is H or a $C_{2-8}$ linear or branched alkyl, containing at least 90% by weight of propylene, preferably at least 95% propylene. This copolymer has solubility in xylene at room temperature lower than 15% by weight, preferably lower than 10%, and even more preferably lower than 8%. Said alpha-olefin is preferably ethylene, 1-butene, 1-pentene, 4-methylpentene, 1-hexene, 1-octene or combinations thereof, and even more preferably it is ethylene.

The elastomeric fraction (B) of the polyolefin compositions of the invention comprises a copolymer of propylene with ethylene, and a copolymer of ethylene with an alpha-olefin $H_2C=CHR^2$, where $R^2$ is a $C_{2-8}$ alkyl. By "elastomeric" is meant herein a polymer having low cristallinity or amorphous, having a solubility in xylene at room temperature greater than 40% by weight.

The copolymer (1) of propylene with ethylene contains from 20 to 35% by weight of ethylene, preferably from 25 to 30%, and has a solubility in xylene at room temperature greater than 45% by weight, preferably greater than 50%; the intrinsic viscosity of the xylene soluble fraction ranges from 1.0 to 3.0 dl/g, and more preferably from 1.5 to 2.5 dl/g.

The copolymer (2) is a copolymer of ethylene with at least one alpha olefin of formula $H_2C=CHR^2$, where $R^2$ is a $C_{2-8}$ linear or branched alkyl, optionally containing 0.5 to 5% by weight of a diene; said alpha-olefin is preferably 1-butene, 1-hexene or 1-octene, and even more preferably is 1-butene. The alpha-olefin content ranges from 15% to 40% by weight, and preferably from 20 to 35%. The copolymer (2) has solubility in xylene at room temperature greater than 35% by weight, preferably greater than 40%, and the intrinsic viscosity of the xylene soluble fraction ranges from 1.0 to 3.0 dl/g, preferably from 1.5 to 2.5 dl/c.

As previously reported, the copolymers (1) and (2) of the elastomeric fraction (B) may contain a diene, conjugated or not, such as butadiene, 1,4-hexadiene, 1,5-hexadiene and ethylidene-norbornene-1. The diene, when present, is contained in an amount of from 0.5 to 5% by weight, with respect to the weight of the fraction (B).

The weight ratio of the elastomeric copolymers (1)/(2) ranges from 1:5 to 5:1, and preferably from 1:2 to 2:1.

The polyolefin composition of the invention has a flexural modulus ≦130 MPa, and preferably ≦100 MPa; Shore D hardness ≦40, and preferably ranging from 25 to 35; and MFR ≧1.5 g/10 min, preferably ≧2.0 g/10 min, and even more preferably ≧3.0 g/10 min. According to a preferred embodiment of the invention, the polyolefin composition is in the form of spherical particles having an average diameter of 250 to 7,000 microns, a flowability of less than 30 seconds and a bulk density (compacted) greater than 0.4 g/ml. The polyolefin composition of the invention may be prepared by sequential polymerization in at least three stages; according to a preferred embodiment, the sequential polymerization is carried out in the presence of a catalyst comprising a trialkylaluminum compound, optionally an electron donor, and a solid catalyst component comprising a halide or halogen-alcoholate of Ti, and an electron-donor compound supported on anhydrous magnesium chloride.

It is therefore another object of the present invention a process for the preparation of the polyolefin compositions as reported above, said process comprising at least three sequential polymerization stages with each subsequent polymerization being conducted in the presence of the polymeric material formed in the immediately preceding polymerization reaction, wherein the crystalline copolymer (A) is prepared in at least one first stage, and the elastomeric fraction (B) is prepared in at least two sequential stages. The polymerization stages may be carried out in the presence of a Ziegler-Natta and/or a metallocene catalyst.

Suitable Ziegler-Natta catalysts are described in U.S. Pat. No. 4,399,054 and EP-A-45 977. Other examples can be found in U.S. Pat. No. 4,472,524.

The solid catalyst components used in said catalysts comprise, as electron-donors (internal donors), compounds selected from the group consisting of ethers, ketones, lactones, compounds containing N, P and/or S atoms, and esters of mono- and dicarboxylic acids.

Particularly suitable electron-donor compounds are phtlialic acid esters, such as diisobutyl, dioctyl, diphenyl and benzylbutyl phthatate.

Other suitable electron-donors are 1,3-diethers of formula:

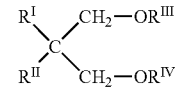

wherein $R^I$ and $R^{II}$, the same or different from each other, are $C_1$-$C_{18}$ alkyl, $C_3$-$C_{18}$ cycloalkyl or $C_7$-$C_{18}$ aryl radicals; $R^{III}$ and $R^{IV}$, the same or different from each other, are $C_1$-$C_4$ alkyl radicals; or are the 1,3-diethers in which the carbon atom in position 2 belongs to a cyclic or polycyclic structure made up of 5, 6 or 7 carbon atoms and containing two or three unsaturations.

Ethers of this type are described in EP-A-361 493 and EP-A-728 769.

Representative examples of said dieters are 2-methyl-2-isopropyl-1,3-dimethoxypropane, 2,2-diisobutyl-1,3-dimethoxypropane, 2-isopropyl-2-cyclopentyl-1,3-dimethoxypropane, 2-isopropyl-2-isoamyl-1,3-dimethoxypropane, and 9,9-bis(methoxymethyl)fluorene.

The preparation of the above mentioned catalyst components is carried out according to various methods.

For example, a $MgCl_2 \cdot nROH$ adduct (in particular in the form of spheroidal particles) wherein n is generally from 1 to 3 and ROH is ethanol, butanol or isobutanol, is reacted with an excess of $TiCl_4$ containing the electron-donor compound. The reaction temperature is generally from 80 to 120° C. The solid is then isolated and reacted once more with $TiCl_4$, in the presence or absence of the electron-donor compound, after which it is separated and washed with aliquots of a hydrocarbon until all chlorine ions have disappeared.

In the solid catalyst component the titanium compound, expressed as Ti, is generally present in an amount from 0.5 to 10% by weight. The quantity of electron-donor compound which remains fixed on the solid catalyst component generally is 5 to 20% by moles with respect to the magnesium dihalide.

The titanium compounds which can be used in the preparation of the solid catalyst component are the halides and the halogen alcoholates of titanium. Titanium tetrachloride is the preferred compound.

The reactions described above result in the formation of a magnesium halide in active form. Other reactions are known in the literature, which cause the formation of magnesium halide in active form starting from magnesium compounds other than halides, such as magnesium carboxylates.

The Al-alkyl compounds used as co-catalysts comprise Al-trialkyls, such as Al-triethyl, Al-triisobutyl, Al-tri-n-butyl, and linear or cyclic Al-alkyl compounds containing two or more Al atoms bonded to each other by way of O or N atoms, $SO_4$ or $SO_3$ groups. The Al-alkyl compound is generally used in such a quantity that the Al/Ti ratio be from 1 to 1000.

The electron-donor compounds that can be used as external donors include aromatic acid esters such as alkyl benzoates, and in particular silicon compounds containing at least one Si—OR bond, where R is a hydrocarbon radical.

Examples of silicon compounds are (tert-butyl)$_2$Si (OC H$_3$)$_2$, (cyclohexyl)(methyl)Si (OCH$_3$)$_2$, (phenyl)$_2$Si (OCH$_3$)$_2$ and (cyclopentyl)$_2$Si (OCH$_3$)$_2$. 1,3-diethers having the formulae described above can also be used advantageously. If the internal donor is one of these dieters, the external donors can be omitted.

The solid catalyst component have preferably a surface area (measured by BET) of less than 200 m$^2$/g, and more preferably ranging from 80 to 170 m$^2$/g, and a porosity (measured by BET) preferably greater than 0.2 ml/g, and more preferably from 0.25 to 0.5 ml/g.

The catalysts may be precontacted with small quantities of olefin (prepolymerization), maintaining the catalyst in suspension in a hydrocarbon solvent, and polymerizing at temperatures from ambient to 60° C., thus producing a quantity of polymer from 0.5 to 3 times the weight of the catalyst. The operation can also take place in liquid monomer, producing, in this case, a quantity of polymer 1000 times the weight of the catalyst.

By using the above mentioned catalysts, the polyolefin compositions are obtained in spheroidal particle form, the particles having an average diameter from about 250 to 7,000 microns, a flowability of less than 30 seconds and a bulk density (compacted) greater than 0.4 g/ml.

Other catalysts that may be used in the process according to the present invention are metallocene-type catalysts, as described in U.S. Pat. No. 5,324,800 and EP-A-0 129 368; particularly advantageous are bridged bis-indenyl metallocenes, for instance as described in U.S. Pat. No. 5,145,819 and EP-A-0 485 823. Another class of suitable catalysts are the so-called constrained geometry catalysts, as described in EP-A-0 416 815, EP-A-0 420 436, EP-A-0 671 404, EP-A-0 643 066 and WO 91/04257. These metallocene compounds may be used to produce the copolymers (1) and (2) of the elastomeric fraction (B).

According to a preferred embodiment, the polymerization process of the invention comprises three stages, all carried out in the presence of Ziegler-Natta catalysts, where: in the first stage the relevant monomer(s) are polymerized to form the crystalline copolymer (A); in the second stage a mixture of propylene and ethylene, and optionally a diene are polymerized to form the copolymer (B) (1); and in the third stage a mixture of ethylene and an alpha-olefin H$_2$C=CHR$^2$, where R$^2$ is a C$_{2-8}$ alkyl, and optionally a diene, are polymerized to form the copolymer (B) (2).

The polymerization stages may occur in liquid phase, in gas phase or liquid-gas phase. Preferably, the polymerization of the crystalline copolymer fraction (A) is carried out in liquid monomer (e.g. using liquid propylene as diluent), while the copolymerization stages of the copolymers (B)(1) and (B)(2) are carried out in gas phase, without intermediate stages except for the partial degassing of the propylene. According to a most preferred embodiment, all the three sequential polymerization stages are carried out in gas phase.

The reaction temperature in the polymerization stage for the preparation of the crystalline copolymer (A) and in the preparation of the copolymers (B)(1) and (B)(2) can be the same or different, and is preferably from 40° C. to 90° C.; more preferably, the reaction temperature ranges from 50 to 80° C. in the preparation of the fraction (A), and from 40 to 80° C. for the preparation of components (B)(1) and (B)(2).

The pressure of the polymerization stage to prepare the fraction (A), if carried out in liquid monomer, is the one which competes with the vapor pressure of the liquid propylene at the operating temperature used, and is possibly modified by the vapor pressure of the small quantity of inert diluent used to feed the catalyst mixture, and the overpressure of the monomers and the hydrogen optionally used as molecular weight regulator.

The polymerization pressure preferably ranges from 33 to 43 bar, if done in liquid phase, e and from 5 to 30 bar if done in gas phase. The residence times relative to the three stages depend on the desired ratio between the fractions, and can usually range from 15 minutes to 8 hours. Conventional molecular weight regulators known in the art, such as chain transfer agents (e.g. hydrogen or ZnEt$_2$), may be used.

The polyolefin compositions of the present invention find application in the preparation of films and sheets, and in particular of cast films. In fact, they possess a high fluidity, without the need of peroxide treatments. Moreover, they show a good balance of softness and mechanical properties, and retain acceptable optical properties.

In cast films, which are often a multilayer structure with PE or other polymer films, the polyolefin compositions of the present invention improve the sealing of the skin and the core layers, thus avoiding delamination problems.

Other possible applications of the gel free polyolefin compositions of the present invention, having high MFR values and high softness, are in electric and electronic appliances with soft touch surfaces produced by injection moulding, in particular for handles and grips; for producing rests handles by injection moulding; for producing fibres with improved elasticity, softness and sealability, maintaining good spinning; and in medical tubing.

The compositions of the invention may be used in combination with other elastomeric polymers, such as ethylene/propylene copolymers (EPR), ethylene/propylene/diene terpolymers (EPDM), copolymers of ethylene with C$_4$-C$_{12}$ alpha-olefins (e.g. ethylene/octene-1 copolymers, such as the ones commercialized under the name Engage®) and mixtures thereof. Such elastomeric polymers may be present in an amount of 5 to 80% by weight on the total composition.

Conventional additives, fillers and pigments, commonly used in olefin polymers, may be added, such as nucleating agents, extension oils, mineral fillers, and other organic and inorganic pigments.

The following analytical methods have been used to determine the properties reported in the detailed description and in the examples.

| Property | Method |
| --- | --- |
| Melt Flow Rate (MFR) | ISO 1133 |
| Ethylene % by weight | I.R. Spectroscopy |
| 1-Butene % by weight | I.R. Spectroscopy |
| Intrinsic Viscosity | In tetrahydronaphthalene, at 135° C. |
| Flexural modulus at 23° C. | ASTM D730M (3 hours) |
| Shore Hardness D | ASTM D 2240 |
| Tensile strength at break and at yield | ASTM D 638 (3 hours) |
| Elongation at break and at yield | ASTM D 638 (3 hours) |
| Haze | ASTM D 1003 (100 micron film) |
| Surface area | B.E.T. |
| Porosity | B.E.T. |
| Bulk density | DIN 53194 |

Determination of Xylene Solubility at Room Temperature (% by Weight):

2.5 g of polymer were dissolved in 250 ml of xylene, at 135° C., under agitation. After 20 minutes, the solution was cooled to 25° C. under stirring, and then it was allowed to settle for 30 minutes.

The precipitate was filtered with filter paper; the solution was evaporated under a nitrogen current, and the residue dried under vacuum at 80° C. until reached constant weight. The weight percentage of polymer soluble in xylene at room temperature was then calculated. The percent by weight of polymer insoluble in xylene at room temperature was considered the isotactic index of the polymer. This value corresponded substantially to the isotactic index determined by extraction with boiling n-heptane, which by definition constitutes the isotactic index of polypropylene.

Unless otherwise specified, the samples to be subjected to the various physical-mechanical analyses were molded by use of a Negri & Bossi injection press 90, after stabilizing the sample with IRGANOX R 1010 hindered phenolic stabilizer (0.05% by weight), and Q IRGAFOS 168 phosphite stabilizer (0.1% by weight), and pelletizing the sample with a twin-screw Berstorff extruder (barrel diameter 25 mm) at 210° C.

The conditions were as follows:
temperature of the melt: 220° C.;
temperature of the mold: 60° C.;
injection time: 9 sec;
cooling time: 15 sec.

The dimensions of the plaques for the tests were 127×127× 2.5 mm. From these plaques, C-type dumbbells were cut and submitted to tensile strength tests with a head speed of 500 mm/min. Also the specimens for the flexural modulus and hardness Shore D were cut from these plaques. All the specimens were cut parallel to the advancement front and consequently perpendicular to the flow direction.

EXAMPLES 1-6

Preparation of the Catalyst System

A catalyst component comprising $MgCl_2.3C_2H_5OH$ adduct was prepared as follows: 28.4 g of anhydrous $MgCl_2$, 49.5 g of pure anhydrous ethanol, 100 ml of ROL OB/30 vaseline oil, and 100 ml of silicone oil (350 cs viscosity) were introduced in a flask immersed in a bath thermoregulated, at 120° C. under agitation, in an inert atmosphere, until the $MgCl_2$ was completely dissolved. The mixture was then transferred hot, always under an inert atmosphere, in a 150 ml container equipped with a heating jacket, and containing 150 ml of vaseline oil and 150 ml of silicone oil. The mixture was maintained at 120° C. and under agitation, the latter being carried out with a Hanke & Kunkel K. G. Ika Werke Ultra Turrax T-45 N agitator. Said agitation continued for 3 minutes at 3000 rpm. The mixture was discharged into a 2 liter vessel containing 1000 ml of anhydrous n-heptane stirred and cooled so that the final temperature did not exceed 0° C. The $MgCl_2.3EtOH$ microspheres thus obtained were filtered and dried under vacuum at room temperature. The dried adduct obtained in this manner was then dealcoholated by heating at temperatures gradually increasing from 50° C. to 100° C., under nitrogen current, until the alcohol content was 1.1 moles per mole $MglC_2$.

The partially dealcoholated adduct thus obtained had a surface area of 11.5 $m^2/g$, a porosity of 0.13 and bulk density of 0.564 g/cc.

25 g of the obtained adduct were added, under stirring at 0° C., to 625 ml of $TiCl_4$. The mixture was then heated to 100° C. in 1 hour. When the temperature reached 40° C., diisobutylphthalate was added in an amount such that the Mg/diisobutylphtahalate molar ratio was 8. The resulting mixture was heated at 100° C. for 2 more hours, then allowed to settle, and the liquid was siphoned off hot. 550 ml of $TiCl_4$ were added and the mixture was heated at 120° C. for 1 hour.

The obtained mixture was allowed to settle and the liquid was siphoned off hot. The solid was washed 6 times using 200 ml of anhydrous hexane at 60° C., and three more times using 200 ml of anhydrous hexane at room temperature.

After drying under vacuum, the solid presented porosity equal to 0.383 ml/g and surface area equal to 150 $m^2/g$.

General Polymerization Process

The polymerizations were done in stainless steel fluidized bed reactors.

During the polymerization, the gas phase in each reactor was continuously analyzed by gaschromatography in order to determine the content of ethylene, propylene and hydrogen. Ethylene, propylene, 1-butene and hydrogen were fed in such a way that during the course of the polymerization their concentration in gas phase remained constant, using instruments that measure and/or regulate the flow of the monomers.

The operation was continuous in three stages, each one comprising the polymerization of the monomers in gas phase.

Propylene was prepolymerized in liquid propane in a 75 liters stainless steel loop reactor with an internal temperature of 20-25° C. in the presence of a catalyst system comprising a solid component (15-20 g/h) prepared as described above, and a mixture of 75-80 g/h Al-triethyl (TEAL) in a 10% hexane solution and an appropriate quantity of dicyclopenthyldimethoxysilane (DCPMS) donor, so that the TEAL/ DCPMS wt. ratio was 5. The catalyst was prepared according to the process reported above.

1st stage—The thus obtained prepolymer was discharged into the first gas phase reactor, having a temperature of 60° C. and a pressure of 14 bar. Thereafter, hydrogen, propylene, ethylene and an inert gas were fed in the ratio and quantities reported in Table 1, to obtain the composition of the gas phase reported in Table 1, and the polymerization was carried out for 27 minutes.

2nd stage—After removing a sample to carry out the various analyses, the polymer obtained from the first stage was discharged into the second phase reactor having a temperature of 60° C. and a pressure of 18 bar. Thereafter, hydrogen, propylene, ethylene and an inert gas were fed in the ratio and quantities reported in Table 1, to obtain the composition of the gas phase reported in Table 1, and the polymerization was carried out for 23 minutes.

3rd stage—After removing a sample to carry out the various analyses, the polymer obtained from the second stage was discharged into the third phase reactor, having a temperature of 70° C. and a pressure of 14 bar. Thereafter, hydrogen, ethylene, 1-butene and an inert gas were fed in the ratio and quantities reported in Table 1, to obtain the composition of the gas phase reported in Table 1, and the polymerization was carried out for the time reported in Table 1.

At the end of the polymerization, the particulate polymer was discharged, at atmospheric pressure, into a vessel where a countercurrent steam was fed in order to strip the remaining monomers. Thereafter, the polymer was discharged into a vessel, where countercurrent nitrogen was fed at 80-90° C. in order to dry the polymer.

The operating conditions used in the above process and the results of the analyses performed on the polymer compositions obtained therefrom are shown in Tables 1 and 2 respectively.

alkyl, the crystalline propylene copolymer comprising a solubility in xylene at room temperature lower than 15% by weight;

(B) from 60 to 85% by weight of an elastomeric fraction comprising:
(1) a propylene and ethylene copolymer comprising from 20 to 35% by weight of ethylene, the propylene and ethylene copolymer comprising a solubility in xylene at room temperature greater than 45% by weight, and a xylene soluble fraction of the propylene and ethylene copolymer comprising an intrinsic viscosity in tetrahydronaphthalene at 135° C. ranging from 1.0 to 3.0 dl/g; and

TABLE 1

|  | Ex. 1 | Ex. 2 | Ex. 3 | Ex. 4 | Ex. 5 | Ex. 6 |
|---|---|---|---|---|---|---|
| 1st stage (gas phase) | | | | | | |
| Split (% wt.) | 29 | 28 | 28 | 27 | 27 | 26 |
| $H_2$ in gas phase (% mol) | 5.9 | 5.9 | 5.9 | 6.2 | 6.2 | 6.2 |
| Ethylene in gas phase (% mol) | 0.7 | 0.7 | 0.7 | 0.7 | 0.7 | 0.7 |
| Propylene in gas phase (% mol) | 23.9 | 23.9 | 23.9 | 22.5 | 22.5 | 22.5 |
| Ethylene in (A) (% wt) | 3.6 | 3.4 | 3.4 | 3.4 | 3.5 | 3.5 |
| MFR "L" (g/10 min) | 74 | 86 | 82 | 74 | 77 | 85 |
| Sol. Xyl. (% wt) | 6.0 | 6.0 | 6.0 | 6.0 | 6.0 | 6.1 |
| 2nd stage (gas phase) | | | | | | |
| Split (% wt) | 35 | 40 | 40 | 39 | 38 | 35 |
| $H_2$ in gas phase (% mol) | 2.7 | 2.7 | 2.7 | 2.9 | 2.9 | 2.9 |
| Ethylene in gas phase (% mol) | 8.9 | 8.9 | 8.9 | 8.6 | 8.6 | 8.6 |
| Propylene in gas phase (% mol) | 48.5 | 48.5 | 48.5 | 47.6 | 47.6 | 47.6 |
| Ethylene in (B)(1) (% wt) | 30 | 25 | 24 | 24 | 24 | 25 |
| Ethylene tot. (% wt) | 18.3 | 15.5 | 14.7 | 15.1 | 14.5 | 14.5 |
| MFR "L" tot. (g/10 min) | 6.8 | 5.7 | 7.8 | n.d. | n.d. | n.d. |
| Sol. Xyl. in (B)(1) (% wt) | 89 | 85 | 83 | n.d. | 83 | n.d |
| Sol. Xyl. tot. (% wt) | 50.9 | 52.7 | 51.7 | n.d. | 50.7 | n.d. |
| I.V. Sol. Xyl. (dl/g) | 2.37 | 2.24 | 2.32 | 2.25 | 2.28 | n.d |
| 3rd stage (gas phase) | | | | | | |
| Split (% wt) | 36 | 32 | 32 | 36 | 35 | 39 |
| Time (minutes) | 115 | 115 | 115 | 98 | 98 | 98 |
| $H_2$ in gas phase (% mol) | 9.9 | 9.9 | 9.9 | 11.1 | 11.1 | 11.1 |
| Ethylene in gas phase (% mol) | 31.6 | 31.6 | 31.6 | 31.0 | 31.0 | 31.0 |
| 1-Butene in gas phase (% mol) | 32.7 | 32.7 | 32.7 | 32.8 | 32.8 | 32.8 |
| 1-Butene in (B)(2) (% wt) | 21 | 22 | 22 | 24 | 24 | 25 |
| Sol. Xyl. in (B)(2) (% wt) | 40 | 42 | 42 | 44 | 46 | 54 |
| I.V. Sol. Xyl. (B)(2)(dl/g) | 2.37 | 2.02 | 1.92 | 1.78 | 1.64 | n.d. |

TABLE 2

|  | Ex. 1 | Ex. 2 | Ex. 3 | Ex. 4 | Ex. 5 | Ex. 6 |
|---|---|---|---|---|---|---|
| MFR "L" (g/10 min) | 2.5 | 3.0 | 3.4 | 3.4 | 2.9 | 3.1 |
| Sol. Xyl. (% wt) | 46.8 | 48.8 | 48.6 | n.d. | 49.4 | 52.0 |
| Ethylene content (% wt.) | 39.9 | 35.6 | 35.4 | 37.1 | 37.7 | 39.8 |
| 1-Butene content (% wt.) | 7.5 | 7.4 | 6.9 | 8.3 | 8.8 | 9.7 |
| I.V. Sol. Xyl. (dl/g) | 2.37 | 2.18 | 2.21 | 2.10 | 2.07 | n.d. |
| Flexural Modulus (MPa) | 82 | 107 | 110 | 98 | 100 | 94 |
| Tensile Strength at Break (MPa) | 13.8 | 16.3 | 17.0 | 15.9 | 15.2 | 15.5 |
| Tensile Strength at Yield (MPa) | 5.9 | 7.1 | 7.1 | 6.7 | 6.5 | 6.5 |
| Elongation at Break (MPa) | 880 | 940 | 960 | 960 | 900 | 980 |
| Elongation at Yield (MPa) | 40.9 | 39.5 | 41.1 | 41.8 | 37.3 | 41.3 |
| Hardness Shore D (°S) | 29.5 | 33.0 | 33.0 | 33.0 | 35.1 | 30.5 |
| Haze (%) | 72.5 | 47.2 | 16.7 | 44.6 | 38.5 | 36.5 |

The invention claimed is:

1. A polyolefin composition comprising:
(A) from 15 to 40% by weight of a crystalline propylene copolymer comprising at least 90% by weight of propylene and at least one alpha-olefin of formula $H_2C=CHR^1$, where $R^1$ is H or a $C_{2-8}$ linear or branched alkyl, the crystalline propylene copolymer comprising a solubility in xylene at room temperature lower than 15% by weight;

(2) an ethylene copolymer comprising 15 to 40% by weight of at least one alpha-olefin of formula $H_2C=CHR^2$, where $R^2$ is $C_{2-8}$ linear or branched alkyl, the ethylene copolymer comprising a solubility in xylene at room temperature greater than 35% by weight, and a xylene soluble fraction of the ethylene copolymer comprising an intrinsic viscosity in tetrahydronaphthalene at 135° C. ranging from 1.0 to 3.0 dl/g;

wherein a weight ratio of B(1) to B(2) ranges from 1:5 to 5:1.

2. The polyolefin composition according to claim 1, wherein the propylene and ethylene copolymer additionally comprises 0.5 to 5% by weight of a diene.

3. The polyolefin composition according to claim 1, wherein the ethylene copolymer additionally comprises 0.5 to 5% by weight of a diene.

4. The polyolefin composition according to claim 1, wherein the crystalline propylene copolymer ranges from 20 to 35% by weight.

5. The polyolefin composition according to claim 1, wherein the crystalline propylene copolymer comprises at least 95% by weight of propylene and the solubility in xylene at room temperature is lower than 10% by weight.

6. The polyolefin composition according to claim 1, wherein the at least one alpha-olefin in the crystalline propylene copolymer is ethylene.

7. The polyolefin composition according to claim 1, wherein the propylene and ethylene copolymer comprises from 25 to 30% by weight of ethylene, the propylene and ethylene copolymer comprising a solubility in xylene at room temperature greater than 50% by weight, and the xylene soluble fraction of the propylene and ethylene copolymer comprises an intrinsic viscosity in tetrahydronaphthalene at 135° C. ranging from 1.5 to 2.5 dl/g.

8. The polyolefin composition according to claim 1, wherein the ethylene copolymer comprises from 20 to 35% by weight of at least one alpha-olefin, the ethylene copolymer comprising a solubility in xylene at room temperature greater than 40% by weight, and the xylene soluble fraction of the ethylene copolymer comprises an intrinsic viscosity in tetrahydronaphthalene at 135° C. ranging from 1.5 to 2.5 dl/g.

9. The polyolefin composition according to claim 1, wherein the at least one alpha-olefin in the ethylene copolymer is 1-butene, 1-hexene, or 1-octene.

10. The polyolefin composition according to claim 1 further comprising a flexural modulus $\leq$130 MPa, a Shore D hardness $\leq$40, and a MFR $\geq$1.5 g/10 min.

11. The polyolefin composition according to claim 8, wherein the flexural modulus is $\leq$100 MPa, the Shore D hardness ranges from 25 to 35, and the MFR is $\geq$2.0 g/10 min.

12. The polyolefin composition according to claim 1, wherein the polyolefin composition is obtained by sequential polymerization in at least three stages carried out in presence of a catalyst comprising a trialkylaluminum compound and a solid catalyst component comprising a halide or halogen-alcoholate of Ti and an electron-donor compound supported on anhydrous magnesium chloride.

13. The polyolefin composition according to claim 12, wherein the catalyst further comprises an electron donor.

14. A process for preparing a polyolefin composition comprising:
(A) from 15 to 40% by weight of a crystalline propylene copolymer comprising at least 90% by weight of propylene and at least one alpha-olefin of formula $H_2C=CHR^1$, where $R^1$ is H or a $C_{2-8}$ linear or branched alkyl, the crystalline propylene copolymer comprising a solubility in xylene at room temperature lower than 15% by weight;
(B) from 60 to 85% by weight of an elastomeric fraction comprising:
(1) a propylene and ethylene copolymer comprising from 20 to 35% by weight of ethylene, the propylene and ethylene copolymer comprising a solubility in xylene at room temperature greater than 45% by weight, and a xylene soluble fraction of the propylene and ethylene copolymer comprising an intrinsic viscosity in tetrahydronaphthalene at 135° C. ranging from 1.0 to 3.0 dl/g; and
(2) an ethylene copolymer comprising 15 to 40% by weight of at least one alpha-olefin of formula $H_2C=CHR^2$, where $R^2$ is $C_{2-8}$ linear or branched alkyl, the ethylene copolymer comprising a solubility in xylene at room temperature greater than 35% by weight, and a xylene soluble fraction of the ethylene copolymer comprising an intrinsic viscosity in tetrahydronaphthalene at 135° C. ranging from 1.0 to 3.0 dl/g;

wherein a weight ratio of B(1) to B(2) ranges from 1:5 to 5:1, and the process comprises at least three sequential polymerization stages with each subsequent polymerization stage being conducted in presence of a polymeric material formed in a immediately preceding polymerization reaction, wherein the crystalline propylene copolymer is prepared in at least one first stage and the elastomer fraction is prepared in at least two sequential stages, wherein the at least three sequential polymerization stages are carried out in presence of a catalyst comprising a trialkylaluminum compound and a solid catalyst component comprising a halide or halogen-alcoholate of Ti and an electron-donor compound supported on anhydrous magnesium chloride, the solid catalyst component comprising a surface area (measured by BET) of less than 200 m$^2$/g, and a porosity (measured by BET) greater than 0.2 ml/g.

15. The process for preparing a polyolefin composition according to claim 14, wherein the catalyst further comprises an electron donor.

16. The process according to claim 14, wherein the at least three sequential polymerization stages are all carried out in gas phase.

17. A film, sheet, or mixture thereof comprising a polyolefin composition comprising:
(A) from 15 to 40% by weight of a crystalline propylene copolymer comprising at least 90% by weight of propylene and at least one alpha-olefin of formula $H_2C=CHR^1$, where $R^1$ is H or a $C_{2-8}$ linear or branched alkyl, the crystalline propylene copolymer comprising a solubility in xylene at room temperature lower than 15% by weight;
(B) from 60 to 85% by weight of an elastomeric fraction comprising:
(1) a propylene and ethylene copolymer comprising from 20 to 35% by weight of ethylene, the propylene and ethylene copolymer comprising a solubility in xylene at room temperature greater than 45% by weight, and a xylene soluble fraction of the propylene and ethylene copolymer comprising an intrinsic viscosity in tetrahydronaphthalene at 135° C. ranging from 1.0 to 3.0 dl/g; and
(2) an ethylene copolymer comprising 15 to 40% by weight of at least one alpha-olefin of formula $H_2C=CHR^2$, where $R^2$ is a $C_{2-8}$ linear or branched alkyl, the ethylene copolymer comprising a solubility in xylene at room temperature greater than 35% by weight, and a xylene soluble fraction of the ethylene copolymer comprising an intrinsic viscosity in tetrahydronaphthalene at 135° C. ranging from 1.0 to 3.0 dl/g;

wherein a weight ratio of B(1) to B(2) ranges from 1:5 to 5:1.

18. A cast film comprising a polyolefin composition comprising:

(A) from 15 to 40% by weight of a crystalline propylene copolymer comprising at least 90% by weight of propylene and at least one alpha-olefin of formula $H_2C=CHR^1$, where $R^1$ is H or a $C_{2-8}$ linear or branched alkyl, the crystalline propylene copolymer comprising a solubility in xylene at room temperature lower than 15% by weight;

(B) from 60 to 85% by weight of an elastomeric fraction comprising:
  (1) a propylene and ethylene copolymer comprising from 20 to 35% by weight of ethylene, the propylene and ethylene copolymer comprising a solubility in xylene at room temperature greater than 45% by weight, and a xylene soluble fraction of the propylene and ethylene copolymer comprising an intrinsic viscosity in tetrahydronaphthalene at 135° C. ranging from 1.0 to 3.0 dl/g; and
  (2) an ethylene copolymer comprising 15 to 40% by weight of at least one alpha-olefin of formula $H_2C=CHR^2$, where $R^2$ is a $C_{2-8}$ linear or branched alkyl, the ethylene copolymer comprising a solubility in xylene at room temperature greater than 35% by weight, and a xylene soluble fraction of the ethylene copolymer comprising an intrinsic viscosity in tetrahydronaphthalene at 135° C. ranging from 1.0 to 3.0 dl/g;

wherein a weight ratio of B(1) to B(2) ranges from 1:5 to 5:1.

* * * * *